US005307414A

United States Patent [19]
Roth

[11] Patent Number: 5,307,414
[45] Date of Patent: Apr. 26, 1994

[54] ENCRYPTION TEMPLATE

[76] Inventor: Gera J. Roth, 155 Dell Park Ave., North York, Ontario, Canada, M6B 2V4

[21] Appl. No.: 995,259

[22] Filed: Dec. 22, 1992

[51] Int. Cl.⁵ .............................. G09C 1/02
[52] U.S. Cl. .......................... 380/56; 380/59; 283/17
[58] Field of Search .......... 380/54, 57, 56, 59, 380/58; 283/17

[56] References Cited

U.S. PATENT DOCUMENTS

| | | | |
|---|---|---|---|
| 156,851 | 11/1874 | Joseph et al. | 380/59 |
| 166,761 | 8/1875 | Flamm | 380/59 |
| 185,621 | 12/1876 | Berghold | 380/59 |
| 1,441,109 | 1/1923 | Newell | 380/59 |

Primary Examiner—Gilberto Barron, Jr.
Attorney, Agent, or Firm—Kenneth M. Garrett

[57] ABSTRACT

An encryption template has a grid of permanent openings thereon forming several arrays which are symmetrically located about a rotational axis, and members for selectively marking certain of the openings to be used for coding a message. Indicia carried on the template and the members facilitate the selection of the openings.

14 Claims, 3 Drawing Sheets

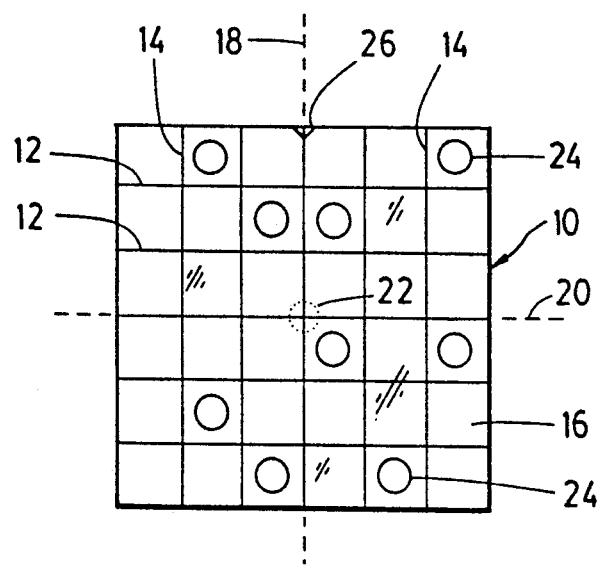
FIG. 1
PRIOR ART
```
C  P  B  E  T  S
B  A  S  T  N  W
E  F  N  N  T  E
P  D  A  R  E  N
P  Y  M  E  G  P
L  O  R  A  A  R
```
FIG. 2
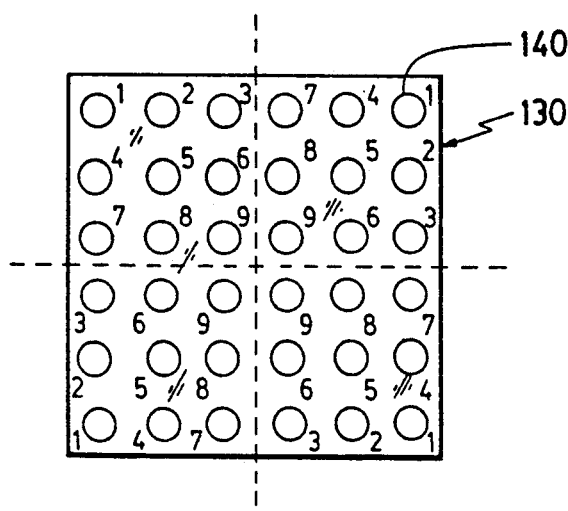
FIG. 8
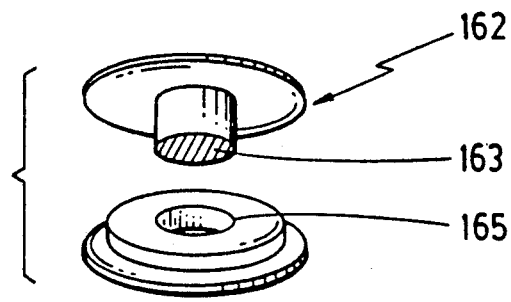
FIG. 9

ENCRYPTION TEMPLATE

FIELD OF INVENTION

This invention relates to improvements to relatively simple devices that may be used for writing coded messages and for decoding same.

BACKGROUND OF INVENTION

In U.S. Pat. No. 166,761 there is described an encryption apparatus which comprises a square plate which is divided by an even number of columns and an equal number of rows to form a grid of squares. Openings are provided in one quarter of the squares, through each of which openings a character forming part of a message can be written. A board having a grid of squares constructed as above will have a rotational axis locating at the point of intersection of the bisectors of adjacent sides of the grid, which bisectors in effect divide the board into four notional quadrants. The position of the openings is selected so that if it is considered that the quadrants were independently rotatable about the notional axis so as to be superposed, no opening would coincide with any other opening. Otherwise expressed, the openings have a perfect rotational asymmetry on the board.

The board is used by writing a character at a time through the openings, which in the illustrative example of the patent are one hundred and forty four in number. The board is then rotated about its rotational axis through ninety degrees (in the patent a locating holder being used) and the next group of one hundred and forty four characters are written, and so on until the board has been rotated through one complete revolution.

The columns and rows of the board are each numbered sequentially, whereby the coordinates of any opening can be readily identified for future reference or for transmission to another person for use in decoding the message. The number of different combinations of openings is very high even where the grid of squares is relatively small, and considerable difficulty arises in ensuring the condition of perfect asymmetry of the location of the openings where this is attempted in a haphazard manner. Moreover, there is no provision for changing the location of the openings in a board. Additionally, the method requires the use of a tool for cutting openings in the board.

In U.S. Pat. No. 156,851 an encryption board which is generally of a similar nature to that described above but which includes indicia repeated in a rotationally symmetrical manner in each quadrant, and the patentee describes a method of selecting the position of openings that will ensure a perfect rotational asymmetry. The method involves making up a table, transferring information from the table to the board, and then cutting openings through the board. This method remains relatively time consuming, and does not overcome the others of the above mentioned drawbacks.

SUMMARY OF INVENTION

The present invention contemplates a board which may be generally of the foregoing nature, but wherein an opening is provided through every grid position, and reusable means is provided for marking selected openings through which the message is to be written, or conversely those openings through which the message is not to be written, or both.

In accordance with one embodiment, this selecting means blocks those openings through which it is intended that a character will not be written, and in accordance with another embodiment, the selecting means serves to physically identify the selected ones of the openings through which it is intended that a character will be written, but both types of selecting means may be used simultaneously if desired, depending somewhat on the structure of the board.

The marking means are permanent in nature, and transferable and reusable to block or restrict any opening in the board, or to otherwise mark the selected openings.

While it is preferred that the grid of openings in the board of the invention be based on a perfect square, which is to say that the openings are centred on a square grid having an even and equal number of rows and columns, other arrangements are possible. Thus assuming a square board with an uneven number of openings along each side, for example a 7×7 grid, the central grid position, which is to say in this instance the position at the intersection of the third row and the third column, would be treated differently to each of the other positions, which other positions would be formed into four identical rectangular arrays of 3×4 openings having a perfect symmetry about the centre of the grid. In general, the grid of openings in the board will form N identical arrays, where N is a small integer greater than two, and the arrays will be perfectly symmetrical about a geometric axis of rotation of the grid. By "perfect symmetry" it is meant that when the board is rotated, each of the arrays of openings may be moved to a position formerly occupied by any other of the arrays.

The means for independently marking the openings will either be such as to indicate $(N-1)/N$ of the openings through which a character is not to be written, or $1/N$ of the openings through which a character is to be written, or both.

Preferably, each opening in an array will be associated with an indicium to mark the position of the opening in that array, suitably the indicia forming an easily recognizable series, for example a numerical or alphabetical sequence. Also preferably, the serial indicia of the one array will be repeated in a rotational symmetrical manner in each other array. As an alternative to indicia carried on the board for repeatedly marking the sequence of openings in each array, the means for marking the openings may carry such indicia. Preferably both the board and the means for marking the openings will carry indicia. Suitably, the board will include means for separately identifying each array, which means can be identical to the foregoing means for identifying the sequence of openings in the array or separate therefrom.

Considering a simple example of a square grid of six by six openings, this will form four arrays each of nine openings. The openings of each array will be respectively numbered one through nine, the sequence of numbers in each array being repeated in a rotationally symmetric manner. Thus, if the numeral one marks an outside corner of one array, it will mark an outside corner of each other array. This means that, for example, by rotating the board so that each array successively locates with respect to an observer in the upper left hand quadrant, the numbering sequence of the array in that quadrant will always be identical. Where, in this example, the reusable means is for marking those openings through which a character will not be written, the twenty-seven members used therefor will comprise three groups of nine members, respectively carrying the numbers one through nine. Where the reusable means is for marking those openings through which characters will be written, the means therefor will form one group of nine numbers respectively carrying the numbers one through nine. Assuming in this example that the members for marking these openings not to be used for writing characters and the members for marking those openings to be used for writing characters are both employed simultaneously, and that the four arrays of openings are differentiated by the letters A, B, C, and D, the members for marking the openings to be used may be initially placed in sequence in array A, and the members to be used for marking the openings not to be used will then be initially placed in sequence in each of the remaining arrays B, C and D. In order to prepare the board for coding a message, it is merely necessary to exchange members from array A with members from arrays B, C and D, with the only proviso being that any two members being exchanged will bear the same indicium thereon, and this will automatically ensure that the perfect rotational asymmetry of the openings in the board selected for writing characters will be retained.

These foregoing objects and aspects of the invention, together with other objects, aspects and advantages thereof will be more apparent from the following description of a preferred embodiment thereof, taken in conjunction with the following drawings.

BRIEF DESCRIPTION OF THE DRAWINGS

FIG. 1 shows in plan view an encryption board in accordance with the prior art;

FIG. 2 shows a block of characters encrypted using the board of FIG. 1;

FIG. 8 shows in plan view a second embodiment of the invention; and

FIG. 9 shows in perspective view in enlarged scale a two part member for blocking selected openings in the board of FIG. 8.

DESCRIPTION OF THE PREFERRED EMBODIMENT

Figure 3:
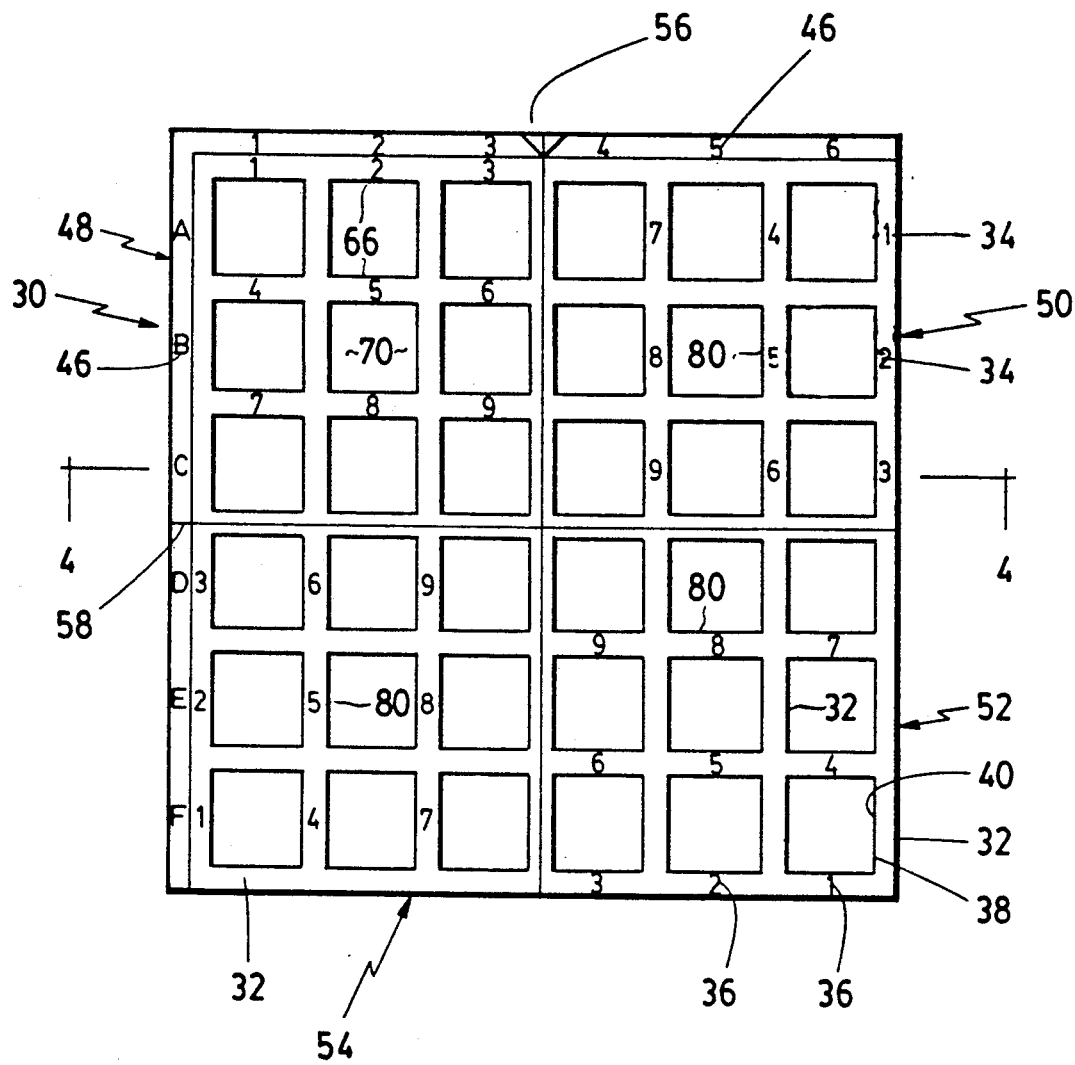
FIG. 3 shows in plan view an encryption board in accordance with the invention.
Figure 4:
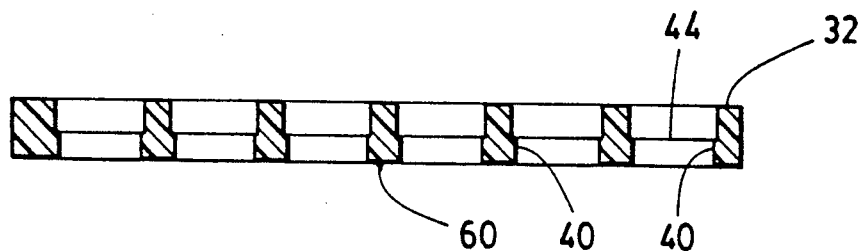
FIG. 4 shows a cross-section on line 4—4 of FIG. 3.
Figure 5:
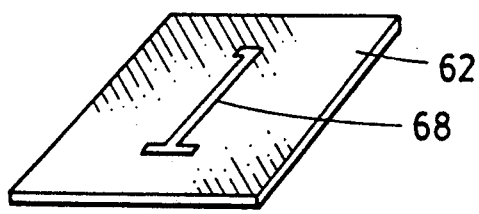
FIG. 5 shows in perspective view in enlarged scale a reusable member for blocking openings in the board of FIG. 3.
Figure 6:
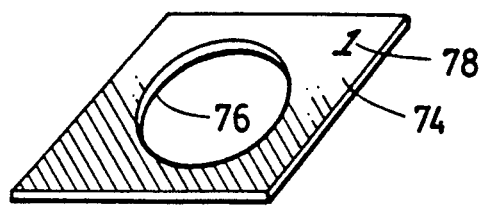
FIG. 6 is similar to FIG. 5 but shows a member for partially blocking openings in the board of FIG. 3.
Figure 7:
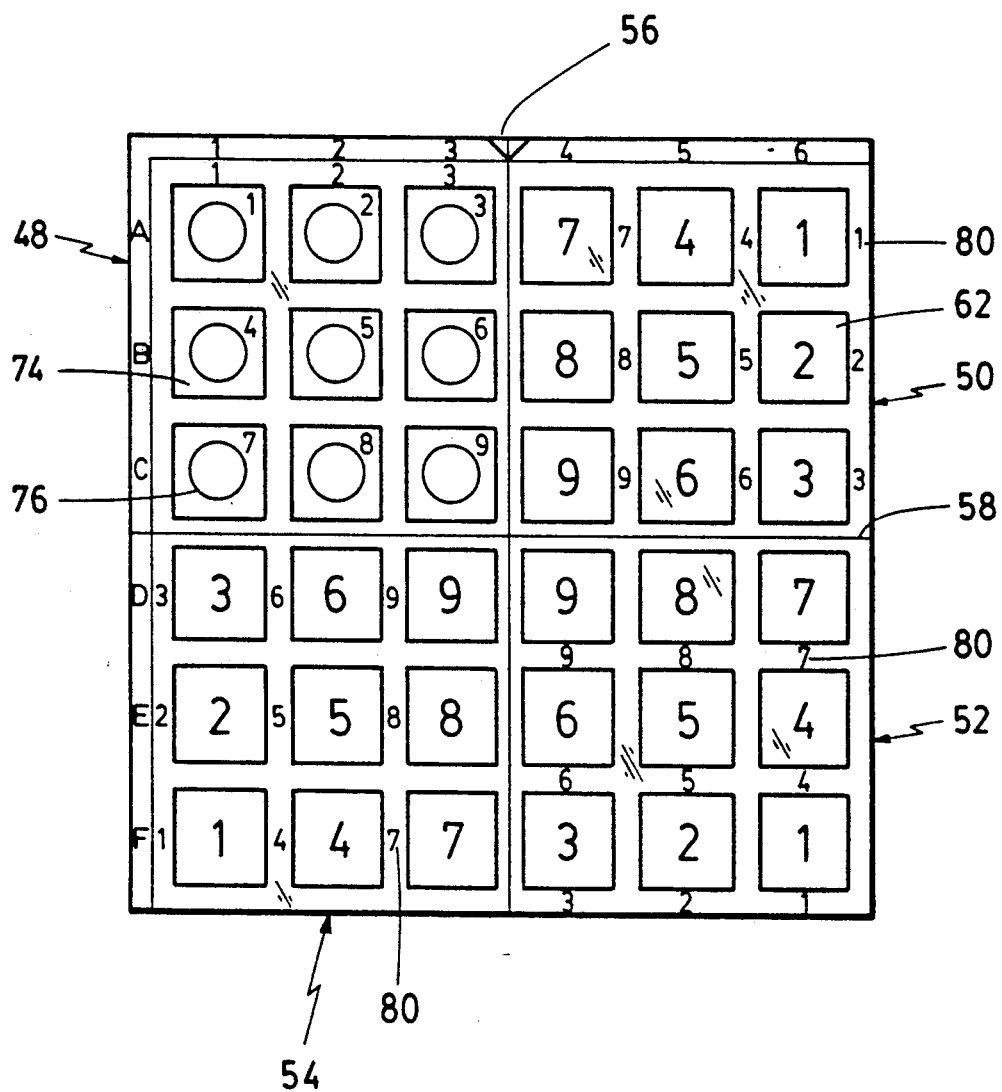
FIG. 7 shows the board of FIG. 3 with the members shown in FIGS. 5 and 6 located thereon.

Referring to the drawings in detail, an encryption board in accordance with the prior art is shown in FIG. 1 wherein it is generally identified by the numeral 10. Board 10, which is typically made of light weight cardboard material is square, and is subdivided by rows 12 and columns 14 to form a perfect grid of squares 16; in this illustrative embodiment, the number of rows 12 and columns is six, forming thirty six squares, but it will be appreciated that a lesser or greater number of rows and columns could be used, although in all instances for a square board the number of rows will equal the number of columns and will always be an even number. Board 10 is notionally divided into four quadrants by notional lines 18,20 which bisect the sides of the board, and the grid of square 16 has a notional axis 22 at the intersection of lines 18,20. One quarter of the squares 16, (i.e. nine squares) are provided with openings 24 therethrough, through which openings a pen or pencil may write a character onto a substrate such as paper. The openings 24 may locate in any quadrant, the sole rule governing their placement being that if it is assumed that the quadrants are independently movable about axis 22 so as to be superposed one on the other, no opening will coincide with any other opening, whereby the openings have a perfect rotational asymmetry about axis 22. A reference mark 26 is located on the upper edge of board 10.

To encrypt a message using board 10, the first nine characters of the message are written through openings 24 onto a suitable substrate. The board 10 is then rotated through ninety degrees, and the next nine characters of the message are written, and so on until thirty six characters are written. Further characters may be interlineated with the first set of characters by moving board 10 by half space sideways and/or downwards, with one hundred and forty-four characters forming a block. It will be apparent that these simple rules of using board 10 can be made more complex. The message is easily decoded by using board 10 or a duplicate thereof with openings located thereon in identical positions to those of the board used for encrypting the message. The first thirty-six characters of a message encrypted using a board similar to board 10 are shown in FIG. 2.

Considering now the encryption board of the invention, this is identified in FIG. 3 by the number 30. Board 30 is subdivided by lands 32 to form rows 34 and columns 36 to form a grid of squares 38 each of which is provided with an opening 40 therethrough, the openings 40 each being marginally smaller than the squares 38 in which they locate so as to form a small ledge 44 surrounding each opening. The left hand land 32 is somewhat enlarged in width and carries grid coordinate reference indicia 46 thereon, comprising the letters A through F corresponding to each row. The uppermost land 32 is similarly enlarged and carries grid coordinate reference indicia thereon comprising the numerals one through six, also identified by the numeral 46, corresponding to each column, thereby permitting each square 48 to be identified and located by its coordinates.

Board 30 may be considered to comprise four identical arrays 48,50,52,54 of openings 40, separated by lines 56,58 which bisect the sides of board 30 and which serve to provide a visual demarcation between the arrays. A pivot point 60 locates on the underside of board 30 at the intersection of lines 56, 58. The openings 40 of three of the arrays, here 50,52, and 54, are blocked by square wafers 62 which are a push fit between the portions of lands 32 surrounding each square 38, and which are further supported by ledge 44. The squares 38 of array 48 are respectively numbered sequentially one through nine by indicia 66. Wafers 62 of each of arrays 50,52,54 are numbered one through nine thereof by indicia 68, and are inserted into board 30. The number sequence of arrays 50,52,54 is rotationally symmetrical with that of array 42, which is to say that if board 30 is rotated about pivot point 60, the sequence of the indicia of any array will be repeated where that array is moved to a position formerly occupied by any other array. Indicia 68 are also repeated at 80 on board 30 adjacent each opening 40 of arrays 50,52 and 54.

The openings 40 of array 48 are partly restricted by modified wafers 74 which have a circular opening 76 therethrough, and which are respectively permanently inscribed at 78 by the numbers one through nine, and which are inserted into the squares of quadrant 48 in the sequence of array 48.

To use board 30, wafers 62 of any of the arrays 50,52 and 54 are interchanged as desired with modified wafers 48 of array 70, the sole proviso being that the numbers inscribed on the wafer and modified wafer being interchanged are identical. This will automatically ensure that the perfect rotational asymmetry of the openings 76 is retained so that when a message is encrypted in an analogous manner as was earlier described in relation to board 10, i.e. by writing characters through openings 76, no character will over-write another character. As described in relation to the use of board 10, board 30 can be used to interlineate characters, the spacing between two openings 76 when they are located in adjacent squares 38 being approximately equal to the diameter of an opening 76. The coordinates of each opening 76 may be noted for further reference or for transmission to another person desiring to decode the message.

In a second embodiment of the invention a board 130 is provided with a grid of circular openings 140, three quarters of which are blocked off by two part buttons 162a, which parts are respectively provided with a post 163 and socket 165 which mate together through openings 140, it being understood that the arrangement is otherwise broadly of a comparable nature to board 30 in regard to the indicia on board 130 for the location of the buttons, and also the indicia (not shown) carried on the buttons.

It will be apparent that many changes may be made to the illustrative embodiment while falling within the scope of the invention, and it is intended that all such changes be covered by the claims appended hereto.

I claim:

1. An encryption board having a grid of openings therethrough, each said opening having a size to permit a writing instrument to be inserted therethrough for the purpose of writing a character on an underlaying substrate;
    said openings forming N identical arrays, where N is a small integer greater than two, said grid having a geometrical axis of rotation about which said arrays are perfectly symmetrical; and
    reusable means selected from the group consisting of
    (a) means for independently selectively marking (N−1)/N of said openings, and
    (b) means for independently selectively marking 1/N of said openings.

2. An encryption board as defined in claim 1, wherein N is equal to four.

3. An encryption board as defined in claim 1, wherein said reusable means for independently marking (N−1)/N of said openings serves to close such openings.

4. An encryption board as defined in claim 1, wherein said reusable means for independently marking 1/N of said openings serves to partially close such openings.

5. An encryption board as defined in claim 1, wherein said reusable means comprises both said marking means.

6. An encryption board as defined in claim 3, wherein said means for closing said openings comprises two part members matable together through said openings.

7. An encryption board as defined in claim 3, wherein said means for closing said openings comprises wafer like members, and wherein said openings have means associated therewith for retaining respective said wafer like members in a closing relationship with said openings.

8. An encryption board as defined in claim 7, wherein said retaining means comprises lands surrounding said openings.

9. An encryption board as defined in claim 1, wherein said board carries coordinate indicia thereon to individually identify each said opening.

10. An encryption board as defined in claim 1, wherein all of the openings of one said array have serially arranged indicia respectively associated therewith indicative of the position of said opening in such array.

11. An encryption board as defined in claim 10, wherein said serially arranged indicia are repeated in a rotationally symmetric manner in each other array.

12. An encryption board as defined in claim 1, wherein said reusable means for marking (N−1)/N of said openings carry serial indicia thereon capable of indicating the position of said reusable means in N−1 of said arrays in a sequence repeated in each such array.

13. An encryption board as defined in claim 1, including a pivot point located on said rotational axis.

14. An encryption board as defined in claim 1, including means to provide a visual demarcation between said arrays.

* * * * *